Jan. 10, 1967 R. A. PETERSON 3,296,885
ACCELERATOR SYSTEM FOR MULTIPLE ENGINE CONTROL
Filed Jan. 21, 1965 3 Sheets-Sheet 1

INVENTOR.
ROBERT A. PETERSON
BY
ATTORNEYS

Jan. 10, 1967  R. A. PETERSON  3,296,885
ACCELERATOR SYSTEM FOR MULTIPLE ENGINE CONTROL
Filed Jan. 21, 1965  3 Sheets-Sheet 3

INVENTOR.
ROBERT A. PETERSON
BY
ATTORNEYS

United States Patent Office 3,296,885
Patented Jan. 10, 1967

3,296,885
ACCELERATOR SYSTEM FOR MULTIPLE
ENGINE CONTROL
Robert A. Peterson, San Leandro, Calif., assignor to Caterpillar Tractor Co., Peoria, Ill., a corporation of California
Filed Jan. 21, 1965, Ser. No. 426,915
6 Claims. (Cl. 74—478)

This invention relates to a pedal actuated lever and valve system which enables the control of three separate valves for directing pressure for acceleration to three engines or three groups of engines.

Large earthmoving equipment such as tractor-scraper units are now operated in tandem or triplet combinations, feasibly and economically, with a single operator at a control station on one of the units. Each unit is individually powered and in some cases each includes two engines. Varying power demands and safety factors require individual control of engines or groups of engines. For example, loading, transporting and spreading operations often require full power while return cycle operation with empty bowls requires very little power. It is also necessary to consider the danger of jackknifing the tandem or triplet operated units if excessive power is applied from the rear engines and this danger is accentuated in negotiating turns.

Multiple controls in the form of foot pedals, where more than two are necessary, have proven cumbersome, inefficient and tiring to the operator.

It is the object of the present invention to provide a control for multiple engines in which a single accelerator pedal is capable of operation in three distinct directions to control three engines or groups of engines in prearranged sequence. Further objects and advantages of the invention and the manner in which it is carried into practice are made apparent in the following specification wherein reference is made to the accompanying drawings.

Figure 1:
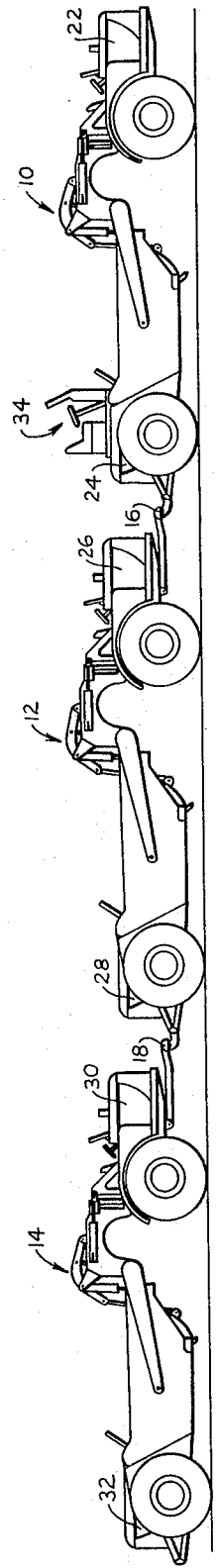
FIG. 1 is a view in elevation of a triplet of tractor-scraper combinations coupled for operation in unison.

As shown in FIG. 1, three tractor-scraper units, indicated generally at 10, 12 and 14, are coupled together with universal connections shown at 16 and 18. Each unit has two engines, one driving the forward or tractor wheels and the other driving the rear or scraper wheels so that six engines, illustrated at 22, 24, 26, 28, 30 and 32, afford power when necessary for the operation of the entire triplet unit combination. An operator's station indicated generally at 34 is disposed in a rearward position on the forward tractor-scraper unit enabling maximum visibility of all units from a single point.

Each of the six engines disclosed includes a conventional adjustable governor control lever and, in accordance with standard practice in remote control, the governor control lever is actuated by a rotor chamber so that it is necessary simply to direct fluid under pressure to the roto chamber in order to effect engine acceleration. Consequently, by directing fluid simultaneously to a group of engines, they may be simultaneously accelerated. For the purpose of the present type multiple unit scraper, it is considered preferable to accelerate only the forward engine on the forward unit where very little power is required. When the power demand increases the next two engines (progressing rearwardly) shown at 24 and 26 are preferably accelerated and when full power or near-full power is required all six engines are simultaneously accelerated.

Figure 2:
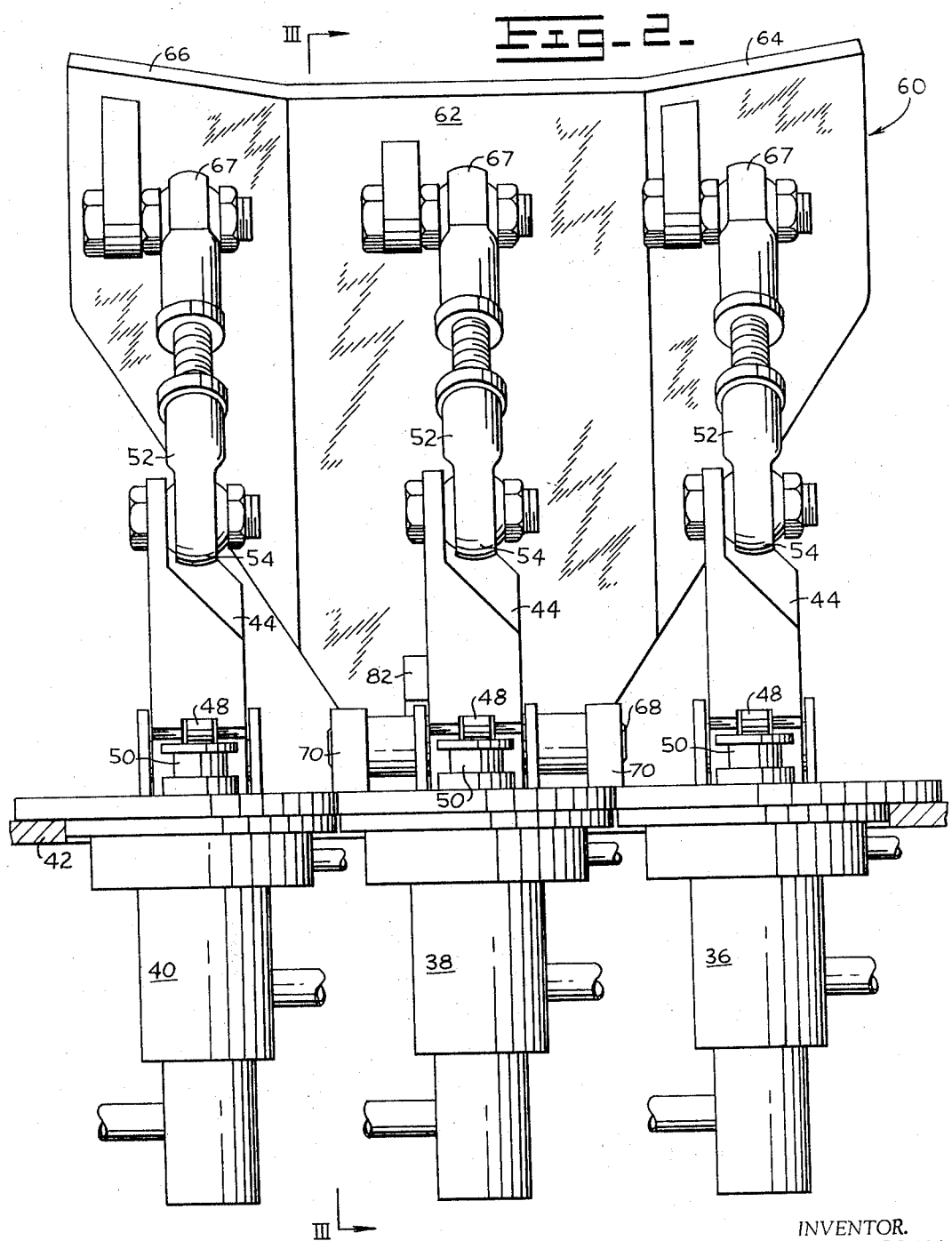
FIG. 2 is a view in front elevation of an accelerator pedal capable of operation to open three valves for directing fluid under pressure to the controls of different engines.
Figure 3:
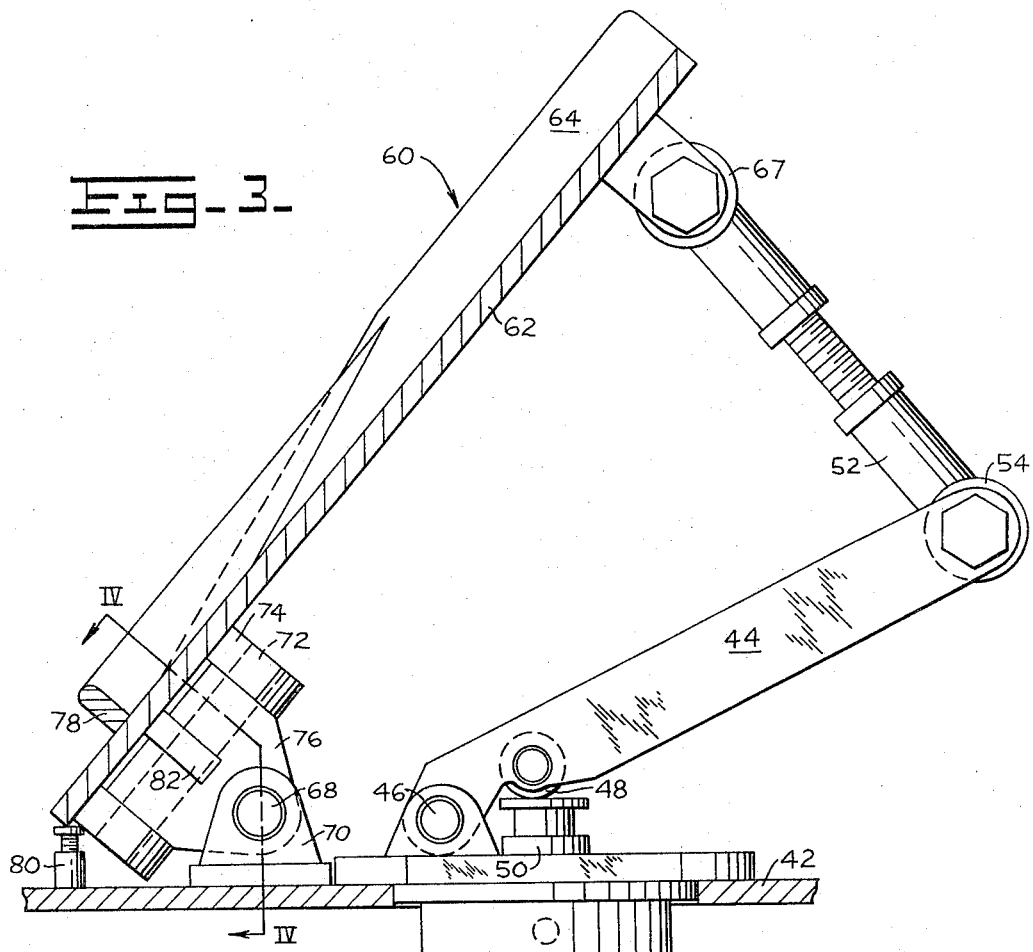
FIG. 3 is a sectional view taken on a line III—III of FIG. 2.

Since the circuits between a source of fluid under pressure and the roto chambers on the several engines may be entirely conventional, they are not herein described but there is shown only three valves, 36, 38 and 40, mounted in the floor plate 42 at the operator's station as shown in FIGS. 2 and 3. The first valve 36 admits air under pressure to the forward engine 22 shown in FIG. 1 for accelerating the same. The second valve 38 admits air to engines 24 and 26 and the third valve 40 admits air for the acceleration of engines 28, 30 and 32. In order to actuate these valves in planned sequence, a lever 44, most clearly shown in FIG. 3, is provided for each valve and is pivoted as at 46. An antifriction device or roller 48 on each lever bears against a spool 50 of each valve. The spool 50 is urged upwardly or to a valve closed position by a spring (not shown) and downward movement of the lever 44 in opposition to the spring force opens the valve. The opposite end of the lever 44 is pivotally secured to an adjustable link 52 by a ball and socket connection 54. A foot pedal generally indicated at 60 has a central flat area 62 and slightly upwardly inclined side areas 64 and 66 and is pivotally connected to the upper ends of links 52 by ball and socket connections 67. This pedal is connected for universal movement with respect to the floor plate 42 by a transverse, horizontally-disposed pivot pin 68 in suitable brackets 70 on the floor plate and by an inclined pin 72 parallel to the plane of the central portion of the pedal and supported in brackets 74. A bearing member 76 extends between the pins 68 and 72.

With the construction just described, the operator's foot when moved toward the left side of the pedal, which is the right side as viewed in FIG. 2, can rock the pedal to the left, opening valve 36 and communicating air under pressure to the single forward engine without disturbing the position of the valves 38 and 40. With the pedal still somewhat inclined to the left, further downward pressure will actuate valves 36 and 38 simultaneously to open these valves and direct pressure to the first three engines of the combined unit. Opening of all three valves is accomplished with the foot disposed centrally of the pedal and exerting straight downward pressure. Consequently, with a single pedal, the operator can easily manipulate one, two or three valves for controlling three separate groups of engines at will.

For convenience, a heel guard shown at 78 in FIG. 3 supports the operator's heel against downward sliding movement while permitting the forward portion of his foot to swing from side to side as required. An adjustable stop 80, also shown in FIG. 3, may be employed to limit the upward swinging movement of the pedal about the pivot pin 68.

Figure 4:
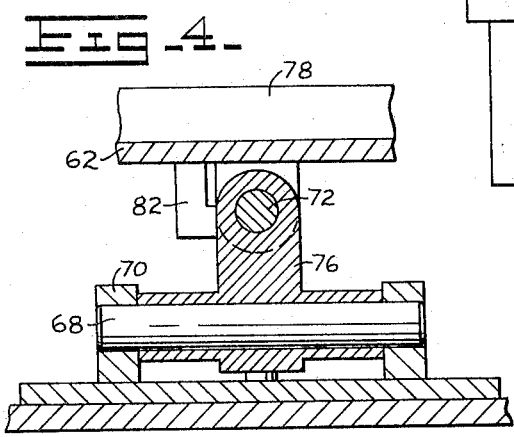
FIG. 4 is a fragmentary sectional view taken on a line IV—IV of FIG. 3.

Since it is unnecessary and may be dangerous to accelerate the rear engine group beyond the output of the forward engines, it is undesirable that the foot pedal be rocked oppositely or to the right (to the left in FIG. 2) and to prevent accidental occurrence of such rocking motion, a stop 82 may be provided, this stop being best illustrated in FIG. 4 as being secured to the bottom of the central portion 62 of the pedal and positioned to bear against the bearing element 76 to limit angular movement of the pedal.

I claim:

1. An acceleration system for multiple engine control which comprises three engine fuel control valves disposed adjacent each other, a control pedal, an operating connection between said pedal and each of said valves to enable opening of any valve by downward movement of said connection, one of said connections being with the mid portion of said pedal and the other two connections being at the respective side portions of the pedal, and a support enabling universal pivotal movement of the pedal, and selective depression of one, two, or all of the operating connections.

2. The combination of claim 1 in which the valves are aligned on a supporting floor plate, the operating connections are with a free end of the pedal, and the opposite end of the pedal is pivoted with respect to the floor plate.

3. The combination of claim 1 with means to prevent selective depression of a predetermined one of said connections.

4. The combination of claim 1 wherein said mid portion is flat and said side portions are upwardly inclined in relation to the mid portion.

5. An acceleration system for multiple engine control which comprises a supporting floor plate, three engine fuel control valves disposed adjacent each other on said floor plate, a control pedal having one end pivotally mounted on said floor plate for downward and sidewise rocking movement, an operating connection between said pedal and each of said valves to enable opening of any valve by downward movement of said connection, said connection between each valve and pedal comprising a lever pivoted at one end on said floor plate adjacent its respective valve, the other end of the levers being connected to the other end of the pedal wherein one lever is connected medially of the pedal and the other two at the sides of the pedal, and means operatively connecting each lever with its respective valve intermediate the ends of each lever whereby upon downward and sidewise rocking movement of the pedal the levers are selectively depressed and the valves are selectively operated.

6. An acceleration system for multiple engine control which comprises a supporting floor plate; a control pedal having an upper and lower end, a medial portion and side portions; said pedal having its lower end pivotally mounted on said floor plate for downward and sidewise rocking movement; three engine fuel control valves disposed adjacent each other in said floor plate, an operating connection between said pedal and each of said valves to enable opening of any valve by downward movement of said connection, said connection between each valve and pedal comprising a lever pivoted at one end on said floor plate adjacent its respective valve, the other ends of the levers being connected to the other end of the pedal in said side and medial portions respectively, and means operatively connecting each lever with its respective valve intermediate the ends of each lever whereby upon downward and sidewise rocking movement of the pedal the levers are operated to selectively operate the valves.

References Cited by the Examiner

UNITED STATES PATENTS

| 1,176,784 | 3/1916 | Speiden | 251—295 X |
| 2,293,409 | 8/1942 | Smith | 74—478 X |

FOREIGN PATENTS

| 1,068,797 | 2/1954 | France. |

MILTON KAUFMAN, *Primary Examiner.*